United States Patent
An et al.

(10) Patent No.: US 9,726,847 B2
(45) Date of Patent: Aug. 8, 2017

(54) CAMERA MODULE HAVING A CONNECTOR CONNECTING A LENS ASSEMBLY AND A LENS BARREL OF THE CAMERA MODULE

(75) Inventors: Myoung Jin An, Seoul (KR); Seung Man Jeong, Seoul (KR); Jin Han Song, Seoul (KR); Kee Tae Um, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 826 days.

(21) Appl. No.: 13/605,520

(22) Filed: Sep. 6, 2012

(65) Prior Publication Data
US 2013/0070101 A1  Mar. 21, 2013

(30) Foreign Application Priority Data
Sep. 19, 2011  (KR) .................. 10-2011-0094344

(51) Int. Cl.
G02B 7/02  (2006.01)
H04M 1/02  (2006.01)
H04N 5/225  (2006.01)

(52) U.S. Cl.
CPC ............ *G02B 7/021* (2013.01); *G02B 7/02* (2013.01); *G02B 7/025* (2013.01); *H04M 1/0264* (2013.01); *H04N 5/2254* (2013.01); *H04N 5/2257* (2013.01)

(58) Field of Classification Search
CPC ........... G02B 7/02; G02B 7/021; G02B 7/025
See application file for complete search history.

(56) References Cited

U.S. PATENT DOCUMENTS

| 6,157,501 | A   | * | 12/2000 | Sato ..................... G02B 7/02 359/811 |
| 6,710,945 | B1  | * | 3/2004  | Miranda ............. G02B 7/021 359/811 |
| 7,639,435 | B2  | * | 12/2009 | Chiang ............... G02B 7/025 359/811 |
| 2005/0030647 | A1 |   | 2/2005  | Amanai |
| 2008/0100934 | A1 | * | 5/2008  | Webster ............. G02B 7/021 359/830 |

(Continued)

FOREIGN PATENT DOCUMENTS

JP  2004-029554 A  1/2004
JP  2008-070484 A  3/2008
(Continued)

OTHER PUBLICATIONS

Machine translation of TW 318130 M.*
(Continued)

*Primary Examiner* — David N Werner
(74) *Attorney, Agent, or Firm* — Saliwanchik, Lloyd & Eisenschenk

(57) ABSTRACT

Disclosed is a camera module. The camera module includes a lens assembly comprising a plurality of lens units having a polygonal outer peripheral portion, a lens barrel receiving the lens assembly, a fixing unit fixing the lens assembly to the lens barrel, a housing coupled with the lens barrel, and a sensor unit in the housing. The lens barrel is provided in a lower portion thereof with a receiving groove, and the receiving groove has a shape corresponding to a shape of the lens assembly.

14 Claims, 4 Drawing Sheets

(56) References Cited

U.S. PATENT DOCUMENTS

| | | | |
|---|---|---|---|
| 2008/0158698 A1* | 7/2008 | Chang | B29D 11/00009 |
| | | | 359/819 |
| 2011/0063722 A1 | 3/2011 | Shyu et al. | |
| 2011/0149143 A1* | 6/2011 | Tsujino | G02B 3/0031 |
| | | | 348/374 |
| 2011/0149417 A1* | 6/2011 | Huang | G02B 7/021 |
| | | | 359/738 |
| 2012/0147489 A1* | 6/2012 | Matsuoka | G02B 7/025 |
| | | | 359/819 |
| 2012/0314309 A1 | 12/2012 | Tatebayashi et al. | |
| 2013/0063655 A1* | 3/2013 | Hsu | G02B 7/021 |
| | | | 348/374 |
| 2013/0077183 A1* | 3/2013 | An et al. | 359/819 |
| 2014/0247488 A1* | 9/2014 | Nagayama | G02B 3/00 |
| | | | 359/503 |
| 2015/0172521 A1* | 6/2015 | Yasukochi | H04N 5/2252 |
| | | | 348/373 |

FOREIGN PATENT DOCUMENTS

| | | |
|---|---|---|
| JP | 2011-070016 A | 4/2011 |
| KR | 10-0723217 B1 | 5/2007 |
| KR | 10-0790714 B1 | 1/2008 |
| KR | 10-2008-0069848 A | 7/2008 |
| KR | 10-2009-0040113 A | 4/2009 |
| TW | 2005-37121 | 11/2005 |
| TW | 2007-14017 | 4/2007 |
| TW | M318130 U | 9/2007 |
| TW | 2011-09164 A | 3/2011 |
| WO | WO-2011/102056 A1 | 8/2011 |

OTHER PUBLICATIONS

Machine translation of KR 10-0723217 B1.*
Office Action dated Oct. 22, 2013 in Japanese Application No. 2012-197340, filed Sep. 7, 2012.

* cited by examiner

CAMERA MODULE HAVING A CONNECTOR CONNECTING A LENS ASSEMBLY AND A LENS BARREL OF THE CAMERA MODULE

CROSS-REFERENCE TO RELATED APPLICATION

This application claims the benefit under 35 U.S.C. §119 of Korean Patent Application No. 10-2011-0094344, filed Sep. 19, 2011, which is hereby incorporated by reference in its entirety.

TECHNICAL FIELD

The embodiment relates to a camera module.

BACKGROUND ART

Recently, a camera module has been installed in a mobile communication terminal, an information technology (IT) device, such as a PDA or an MP3 player, a vehicle, and an endoscope. As the technology has been developed toward the high-pixel camera module from the conventional VGA camera equipped with 0.3 mega pixels, the camera module has been manufactured in a small size with a slim structure according to targets to which the camera module is installed. In addition, the camera module has been equipped with various additional functions, such as auto-focusing or optical zoom functions, at the low manufacturing cost.

Meanwhile, the camera module manufactured in these days is equipped with an image sensor module, which is manufactured through a COB (chip of board) scheme, a COF (chip of flexible) scheme or a CSP (chip scale package) scheme, and is usually connected to a main substrate through an electric connection unit, such as a PCB (printed circuit board) or an FPCB (flexible printed circuit board).

However, users recently request the camera module, which can be directly mounted on the main substrate similar to a general passive element, in such a manner that the manufacturing process for the camera module can be simplified while reducing the manufacturing cost.

The camera module is generally manufactured by attaching an image sensor, such as a CCD or a CMOS, to a substrate through a wire bonding scheme or a flip chip scheme. An image of a subject is focused by the image sensor and the focused image is stored as data in a memory, which is installed inside or outside the camera module. In addition, the stored data are converted into electric signals and the electric signals are displayed as images through a display medium, such as an LCD or a PC monitor provided in a device.

A camera module according to the related art includes a housing, an image sensor supported on a bottom of the housing to convert an image signal received through a lens into an electric signal, a lens group to focus an image signal of a subject to the image sensor, and a barrel in which the lens group are stacked. The housing, the lens group and the barrel are sequentially coupled with each other.

In addition, an FPCB mounted thereon with chip components, which are electric components serving as a condenser and a resistor to drive the image sensor including a CCD or a CMOS, is electrically connected to the bottom of the housing.

In the camera module having the above structure according to the related art, in a state that a plurality of circuit components have been mounted on the FPCB, an ACF (anisotropic conductive film) is inserted between the substrate and the image sensor, and heat and pressure are applied thereto in such a manner that the substrate, the image sensor and the ACF are fixedly bonded and conducted with each other and an IR cut-off filter is attached to an opposite side.

In addition, in a state that the barrel provided therein with a plurality of lens groups is temporally screw-coupled with the housing, as described above, the assembled PCB used for mounting devices is fixedly bonded to the bottom of the housing by an adhesive.

Meanwhile, after the PCB, to which the image sensor is attached, has been fixedly bonded to the housing coupled with the barrel, a focus adjustment is carried out with respect to a subject (resolution chart) located in front of the barrel and spaced apart from the barrel by a predetermined distance. At this time, the focus adjustment of the camera module can be achieved between the lens group and the image sensor while adjusting the vertical displacement by rotating the barrel screw-coupled with the housing.

DISCLOSURE

Technical Problem

The embodiment provides a camera module which can be easily manufactured and realized in a small size.

Technical Solution

According to the embodiment, there is provided a camera module including a lens assembly comprising a plurality of lens units having a polygonal outer peripheral portion, a lens barrel receiving the lens assembly, a fixing unit fixing the lens assembly to the lens barrel, a housing coupled with the lens barrel, and a sensor unit in the housing. The lens barrel is provided in a lower portion thereof with a receiving groove, and the receiving groove has a shape corresponding to a shape of the lens assembly.

According to the embodiment, the fixing unit may be bonded to a bottom surface of the lens barrel and a bottom surface of the lens assembly.

According to the embodiment, the camera module may include an infrared cut-off filter unit provided in the housing.

According to the embodiment, the lens barrel may be provided on an outer peripheral surface thereof with a first screw part, the housing may be provided with a second screw part, and the first screw part may be coupled with the second screw part.

According to the embodiment, the lens units may have a quadrangular outer peripheral surface, and the receiving groove may have a quadrangular shape.

According to the embodiment, each lens unit includes a lens, and a support part integrally formed with the lens, extending from the lens, and has a polygonal outer peripheral portion.

According to the embodiment, the fixing unit may have a dot shape, and may be provided corresponding to the edge of the lens assembly.

Advantageous Effects

As described above, according to the camera module of the embodiment, the lens assembly can be fixed onto the lens barrel by inserting the lens assembly into the receiving groove and by using the fixing unit.

In addition, the lens assembly may have a polygonal shape, in more detail, a quadrangular shape, and the receiving groove may have a quadrangular shape. In addition, the lens barrel may have an outer portion provided in a circular shape. The fixing unit may have a dot shape.

Therefore, according to the camera module of the embodiment, the lens assembly having a polygonal shape can be simply coupled with the lens barrel having a cylindrical structure by using the fixing unit.

Accordingly, the camera module according to the embodiment may have a small size.

In addition, the mass production of the lens assembly having a quadrangular shape can be achieved by manufacturing a plurality of lens assemblies in the form of a substrate and cutting the lens assemblies.

Therefore, the camera module according to the embodiment can be easily manufactured.

BEST MODE FOR INVENTION

Figure 1:
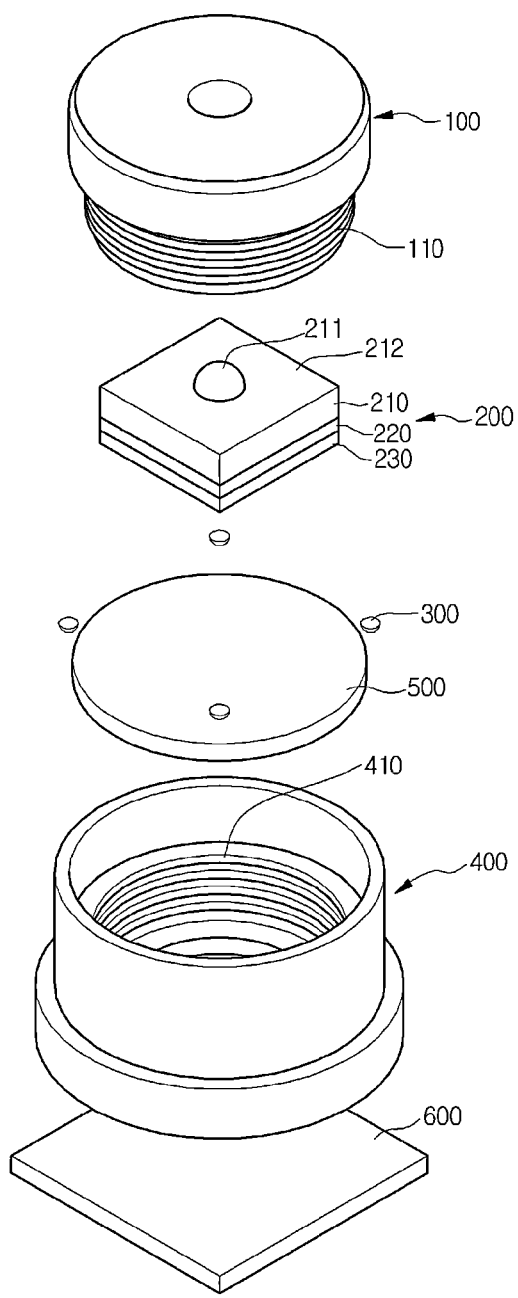
FIG. 1 is an exploded perspective view showing a camera module according to the embodiment.

In the description of the embodiments, it will be understood that when each lens, unit, part, hole, protrusion, groove or layer is referred to as being "on" or "under" another lens, unit, part, hole, protrusion, groove or layer, it can be "directly" or "indirectly" on the other lens, unit, part, hole, protrusion, groove or layer or one or more intervening layers may also be present. Such a position has been described with reference to the drawings. The thickness and size of each layer shown in the drawings may be exaggerated, omitted or schematically drawn for the purpose of convenience or clarity. In addition, the size of elements does not utterly reflect an actual size.

Figure 2:
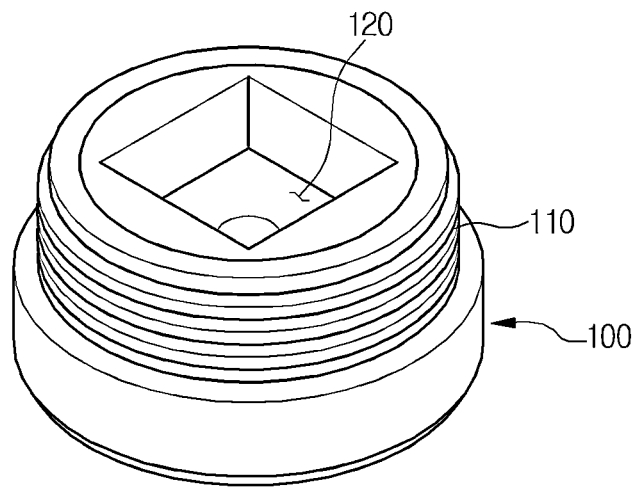
FIG. 2 is a perspective view showing the lower portion of a lens barrel.
Figure 3:
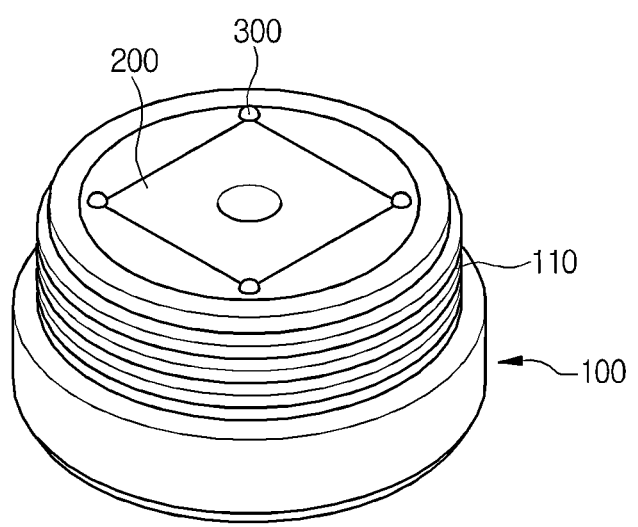
FIG. 3 is a perspective view showing a lens assembly assembled with a lens barrel.
Figure 4:
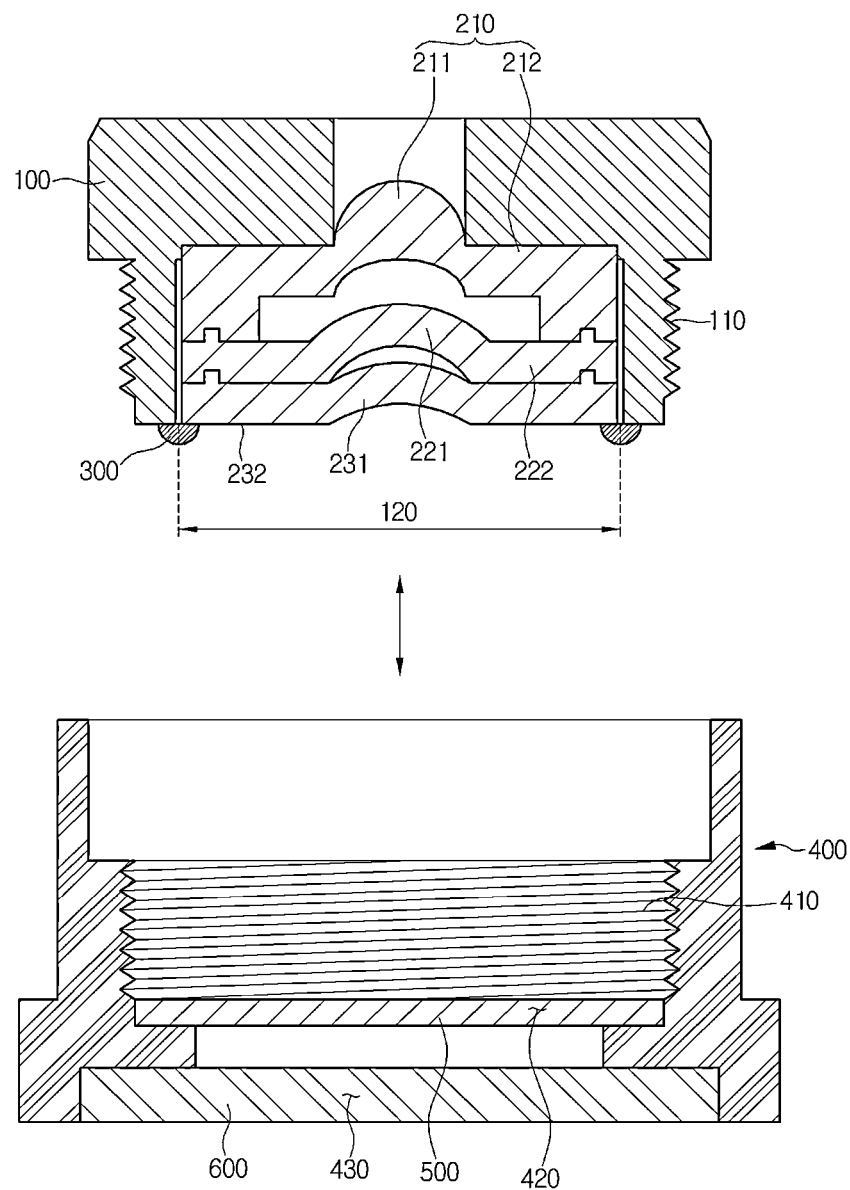
FIG. 4 is a sectional view showing a camera module according to the embodiment.
Figure 5:
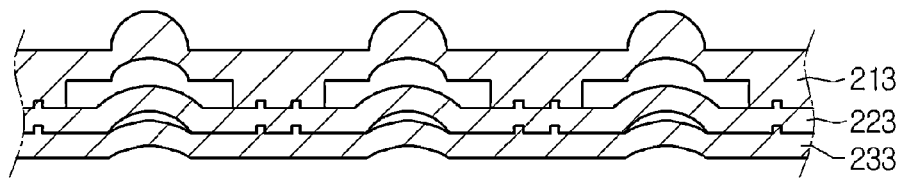
FIGS. 5 and 6 are sectional views showing a procedure of manufacturing the lens assembly.
Figure 6:
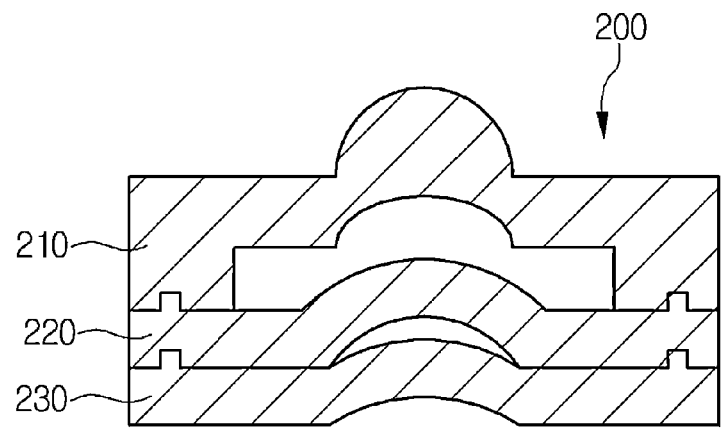

FIG. 1 is an exploded perspective view showing a camera module according to the embodiment, FIG. 2 is a perspective view showing a lower portion of a lens barrel, FIG. 3 is a perspective view showing a lens assembly assembled with a lens barrel, FIG. 4 is a sectional view showing a camera module according to the embodiment, and FIGS. 5 and 6 are sectional views showing a procedure for manufacturing a lens assembly.

Referring to FIGS. 1 to 6, the camera module according to the embodiment includes a lens barrel 100, a lens assembly 200, a fixing unit 300, a housing 400, an IR cut-off filter unit 500 and a sensor unit 600.

The lens barrel 100 receives the lens assembly 200 and the lens assembly 200 therein. The lens barrel 100 has a first receiving groove 120 for receiving the lens assembly 200. The first receiving groove 120 may have a shape corresponding to a shape of the lens assembly 200. When viewed from the bottom, the first receiving groove 120 may have a polygonal shape. In detail, when viewed from the bottom, the first receiving groove 120 may have a quadrangular shape. That is, the first receiving groove 120 may have a quadrangular outer peripheral shape. In more detail, when viewed from the bottom, the first receiving groove 120 may have a rectangular shape. Further, when viewed from the bottom, the first receiving groove 120 may have a square shape.

The lens barrel 100 may have a cylindrical shape. That is, the lens barrel 100 may have a circular outer peripheral shape.

The lens barrel 100 may be coupled with the housing 400. In detail, the lens barrel 100 may be screw-coupled with the housing 400. A male screw part 110 is formed on an outer peripheral surface of the lens barrel 100. The male screw part 110 of the lens barrel 100 is screw-coupled with a female screw part 410 of the housing 400. That is, the male screw part 110 of the lens barrel 100 is mated with the female screw part 410 of the housing 400 in a male-female combination. An interval between the lens assembly 220 and the sensor unit 600 can be adjusted by using the male screw part 110 and the female screw part 410. That is, the interval between the lens assembly 200 and the sensor unit 600 can be adjusted by rotating the lens barrel 100. Thus, the position of the sensor unit 600 can be adjusted such that the sensor unit 600 is located in the whole focal length of the lens assembly 200. That is, the focus between the lens assembly 200 and the sensor unit 600 can be adjusted by coupling the lens barrel 100 with the housing 600.

In addition, the lens barrel 100 includes a light incident groove, which is open upward. The light incident groove exposes the lens assembly 200. An image is incident into the lens assembly 200 through the light incident groove.

The lens assembly 200 is disposed in the lens barrel 100. In detail, the lens assembly 200 is disposed in the first receiving groove 120. The lens assembly 200 is inserted into the first receiving groove 120. The lens assembly 200 has a polygonal outer peripheral shape. In more detail, the lens assembly 200 has a polygonal shape when viewed from the top. In addition, the lens assembly 200 may have a rectangular shape when viewed from the top. In detail, the lens assembly 200 may have a square shape when viewed from the top.

The lens assembly 200 includes a plurality of lens units. For instance, the lens assembly 200 may include a first lens unit 210, a second lens unit 220, and a third lens unit 230. The third lens unit 230, the second lens unit 220, and the first lens unit 210 are sequentially laminated.

The first lens unit 210 includes a first lens 211 and a first support part 212. The first lens 211 includes a curved surface. The first support part 212 extends in the lateral direction from the first lens 211. The first lens 211 may be integrally formed with the first support part 212. The first support part 212 is formed therein with a guide groove for fixing the lens assembly 200 in a desired position.

The second lens unit 220 is disposed under the first lens unit 210. The second lens unit 220 includes a second lens 221 and a second support part 222. The second lens 221 includes a curved surface. The second support part 222 extends in a lateral direction from the second lens 221. The second lens 221 may be integrally formed with the second support part 222. The second support part 222 may be formed therein with a guide groove for fixing the third lens unit 230 in a desired position. In addition, the second support part 222 is formed on the top surface thereof with a guide protrusion so that the second support part 222 is fixed on the first lens part 210.

The third lens unit 230 is disposed under the second lens unit 220. The third lens unit 230 includes a third lens 231 and a third support part 232. The third lens 231 includes a curved surface. The third support part 232 extends in the lateral direction from the third lens 231. The third lens 231 may be integrally formed with the third support part 232. The third support part 232 is formed on a top surface thereof with a guide protrusion fixed to the first lens unit 210.

Although it has been described that the lens assembly 200 includes three lens units, the embodiment is not limited thereto. That is, the lens assembly 200 may include one or two lens units or at least four lens units.

The lens assembly 200 can be formed through the following process.

Referring to FIG. 5, a plurality of lens array substrates 213, 223 and 233 are sequentially laminated. The lens array substrates 213, 223 and 233 include a plurality of lenses. For instance, the third lens array substrate 233, the second lens array substrate 223, and the first lens array substrate 213 are sequentially laminated.

Referring to FIG. 6, the first lens array substrate 213, the second lens array substrate 222, and the third lens array substrate 233 are cut in a state that they are laminated. Thus, a plurality of lens assemblies 200 can be simultaneously formed. In addition, the lens assemblies 200 may have the rectangular shape when viewed from the top.

That is, since the lens assembly 200 is formed through the lamination and cutting processes, the lens assembly 200 inevitably has the polygonal outer peripheral shape.

The fixing unit 300 fixes the lens assembly 200 to the lens barrel 100. The fixing unit 300 is bonded to the lens barrel 100 and the lens assembly 200. In detail, the fixing unit 300 is bonded to bottom surfaces of the lens barrel 100 and the lens assembly 200. In more detail, the fixing unit 300 is directly bonded to the bottom surfaces of the lens barrel 100 and the lens assembly 200.

The fixing unit 300 may have a dot shape. In detail, a plurality of fixing units 300 can be provided in the form of dots while being spaced apart from each other. The fixing unit 300 may be disposed at an edge of the bottom surface of the lens assembly 200.

The fixing unit 300 may include polymer having superior adhesive property, such as epoxy resin. The fixing unit 300 is bonded only to the outer peripheral portion of the lens assembly 200. In other words, the fixing unit 300 is bonded to only the third support part 232 of the lens assembly 200. Thus, the fixing unit 300 may not interfere with the light incident into the lens assembly 200.

In addition, since the fixing unit 300 has the dot shape, the fixing unit 300 can simply and easily fix the lens assembly 200 to the lens barrel 100. That is, after a resin composition has been coated on a region between the lens assembly 200 and the lens barrel 100, the resin composition is cured. Thus, the fixing unit 300 can be formed through a simple process.

The housing 400 receives the sensor unit 600 and the IR cut-off filter unit 500. The housing 400 is coupled with the lens barrel 100. In detail, the housing 400 is screw-coupled with the lens barrel 100. As described above, the female screw part 410 of the housing 400 is screw-coupled with the male screw part 110 of the lens barrel 100.

The housing 400 may include plastic. The housing 400 may have a cylindrical shape. In addition, the housing 400 includes a receiving groove 420 for receiving the IR cut-off filter unit 500 and a receiving groove 430 for receiving the sensor unit 600.

The IR cut-off filter unit 500 is disposed in the housing 400. The IR cut-off filter unit 500 filters the incident infrared ray. The IR cut-off filter unit 500 may cut off the light having excessive long wavelength incident into the sensor unit 600.

The IR cut-off filter unit 500 can be formed by alternately depositing titanium oxide and silicon oxide on optical glass. In order to cut off the infrared ray, the thickness of the titanium oxide and silicon oxide can be properly adjusted.

The sensor unit 600 is accommodated in the housing 400. The sensor unit 600 may include a CCD image sensor or a CMOS image sensor. In addition, the sensor unit 600 further includes a circuit board connected to the image sensor. The sensor unit 600 converts incident images into electric signals.

As described above, according to the camera module of the embodiment, the lens assembly 200 can be fixed to the lens barrel 100 by inserting the lens assembly 200 into the receiving groove 120 and using the fixing unit 300.

In particular, the lens assembly 200 may have a polygonal shape, in more detail, may have a quadrangular shape. The receiving groove 120 may have a quadrangular shape. In addition, the lens barrel may have an outer peripheral portion provided in a circular shape. The fixing part 300 may have a dot shape.

Therefore, according to the camera module of the embodiment, the lens assembly 200 having a polygonal shape can be simply coupled with the lens barrel 100 having a cylindrical structure. In other words, the camera module according to the embodiment may have a small size.

In addition, the fixing unit 300 may be formed in a dot shape through a simple process such as a dotting process and a curing process for resin composition. Therefore, the lens assembly 200 can be easily coupled with the lens barrel 100 by the fixing unit 300.

In addition, the mass production of the lens assembly 200 having a quadrangular shape can be achieved by manufacturing a plurality of lens assemblies in the form of a substrate and cutting the lens assemblies. Therefore, the camera module according to the embodiment can be easily manufactured.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module comprising:
   a lens assembly comprising a plurality of lens units having an outer peripheral portion;
   a lens barrel receiving the lens assembly;
   a connector connecting the lens assembly to the lens barrel;
   a housing coupled with the lens barrel; and
   a sensor in the housing;

wherein the lens barrel is provided in a lower portion thereof with a receiving groove, and the receiving groove has a shape corresponding to a shape of the lens assembly;

wherein an inner side surface of the lens barrel is spaced apart from both an outer top side surface and an outer bottom side surface of the lens assembly;

wherein the connector contacts a bottom surface of the lens barrel and a bottom surface of the lens assembly, and the connector is disposed at a space formed between the inner side surface of the lens barrel and the outer bottom side surface of the lens assembly;

wherein when the lens barrel is fully inserted into the housing, a top surface of the connector extends into the space formed between the inner side surface of the lens barrel and the outer bottom side surface of the lens assembly;

wherein the lens assembly comprises a first lens unit, a second lens unit, and a third lens unit, and the first to third lens units are sequentially laminated; and wherein a portion of the first lens unit is spaced apart from a side surface of the inner side surface of the lens barrel, an entire side surface of the second lens unit is spaced apart from the side surface of the inner side surface of the lens barrel, and an entire side surface of the third lens unit is spaced apart from the side surface of the inner side surface of the lens barrel.

2. The camera module of claim 1, further comprising an infrared cut-off filter unit provided in the housing.

3. The camera module of claim 1, wherein the lens barrel is provided on an outer peripheral surface thereof with a first screw part, the housing is provided with a second screw part, and the first screw part is coupled with the second screw part.

4. The camera module of claim 3, wherein the first screw part is screw-coupled with the second screw part, or the first screw part is mated with the second screw part.

5. The camera module of claim 1, wherein the lens units have a quadrangular outer peripheral portion, and the receiving groove has a quadrangular shape.

6. The camera module of claim 1, wherein the connector has a dot shape, and is arranged corresponding to an outer peripheral portion of the lens assembly.

7. The camera module of claim 6, wherein the connector is arranged corresponding to an edge of the lens assembly.

8. The camera module of claim 1, wherein each lens unit comprises:

a lens; and a support part integrally formed with the lens, extending from the lens, and has a polygonal outer peripheral portion.

9. The camera module of claim 1, wherein each of the first to third lenses comprise a guide groove or a guide protrusion.

10. The camera module of claim 1, wherein an outer peripheral shape of the lens assembly is different from that of the lens barrel.

11. The camera module of claim 1, wherein each of the plurality of lens units has a central portion extending upward from a peripheral portion.

12. The camera module of claim 1, wherein a bottom surface of the connector is disposed at a position lower than that of a bottommost surface of the lens assembly.

13. The camera module of claim 1, wherein a bottom surface of the connector is disposed at a position lower than both a bottommost surface of the lens assembly and a bottommost surface of the lens barrel.

14. The camera module of claim 1, wherein the first lens unit includes a first lens and a first support part, wherein an upper surface of the first support part is in contact with the lens barrel.

* * * * *